(12) United States Patent
Okamoto (10) Patent No.: US 6,402,417 B1
(45) Date of Patent: Jun. 11, 2002

(54) ENGAGEMENT DEVICE CAPABLE OF READILY INTEGRATING TWO MEMBERS

(75) Inventor: Takahiro Okamoto, Osaka (JP)

(73) Assignee: Cateye Co., Ltd., Osaka (JP)

( * ) Notice: Subject to any disclaimer, the term of this patent is extended or adjusted under 35 U.S.C. 154(b) by 0 days.

(21) Appl. No.: 09/516,725

(22) Filed: Mar. 1, 2000

(30) Foreign Application Priority Data

Mar. 1, 1999 (JP) ............................................ 11-052931

(51) Int. Cl.[7] .............................................. F16B 21/00
(52) U.S. Cl. ..................... 403/322.1; 403/321; 403/324; 24/604; 600/503; 600/509
(58) Field of Search ................................. 600/503, 509; 24/604, 606, 633, 615; 403/321, 324, 325, 322.1

(56) References Cited

U.S. PATENT DOCUMENTS

| | | | | |
|---|---|---|---|---|
| 5,098,252 A | * | 3/1992 | Sheesley et al. | ............ 403/324 |
| 5,216,788 A | * | 6/1993 | Bock | ............................ 24/633 |
| 5,245,511 A | * | 9/1993 | Watanabe | .................... 361/814 |
| 5,580,182 A | * | 12/1996 | Lin | .............................. 403/325 |
| 5,687,732 A | * | 11/1997 | Inagaki et al. | .............. 600/503 |
| 5,954,531 A | * | 9/1999 | Jennings et al. | ............ 403/325 |

* cited by examiner

*Primary Examiner*—Lynne H. Browne
*Assistant Examiner*—Aaron Dunwoody
(74) *Attorney, Agent, or Firm*—Olson & Hierl, Ltd.

(57) ABSTRACT

There is provided an engagement device allowing two members to readily engage with each other at a position as desired by the user. A bracket has a left end provided with a fixed protrusion, and a right end provided with a vertically movable lever having a groove obliquely traversing both of the vertical and horizontal directions. When the lever is pushed downward, a Z-letter piece moves leftward relative to the bracket's lower portion. While the lever is pushed with a member desired to be attached to the bracket engaging with a left end of the bracket, a right engaging feature of the member is engaged with a right protrusion of the Z-letter piece.

2 Claims, 7 Drawing Sheets

ENGAGEMENT DEVICE CAPABLE OF READILY INTEGRATING TWO MEMBERS

BACKGROUND OF THE INVENTION

1. Field of the Invention

The present invention relates generally to engagement devices engaging two members and particularly to such compact engagement devices.

2. Description of the Related Art

Figure 6A:
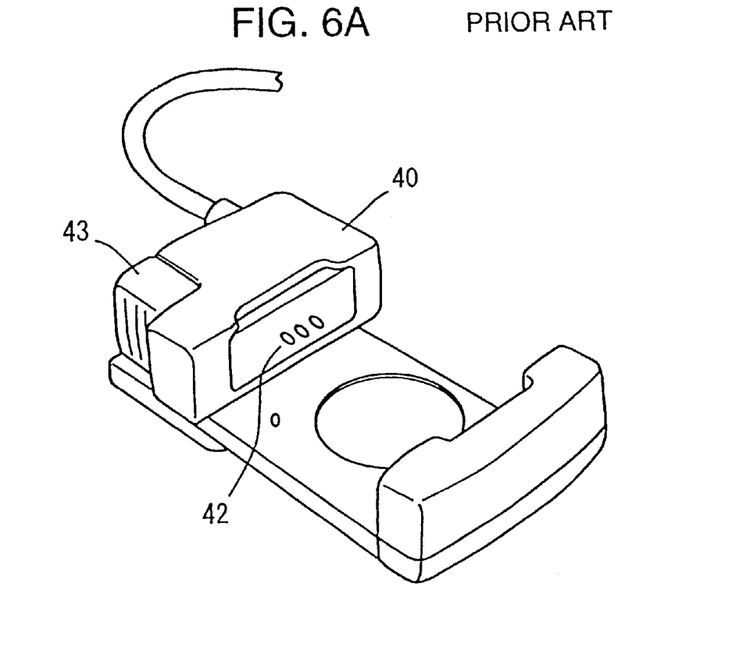
FIGS. 6A and 6B show one example of a conventional engagement device.
Figure 6B:
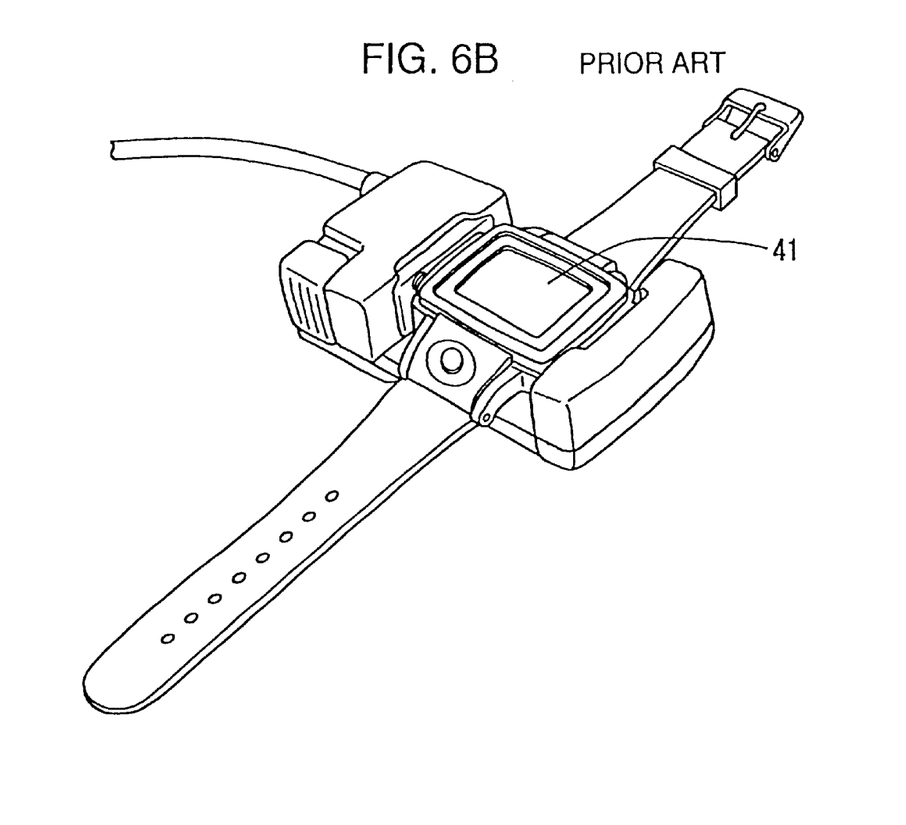

FIGS. 6A and 6B show a structure of an engagement device engaging two members relating to the present invention. FIG. 6A is a perspective view of an interface unit 40 to which an information terminal 41 corresponding to one member is to be mounted, although an information terminal 41 corresponding to the other member has not yet been mounted thereto. FIG. 6B shows interface unit 40 with information terminal 41 mounted thereto. Information terminal 41 and interface unit 40 are interconnected via a connection terminal 42.

Figure 7A:
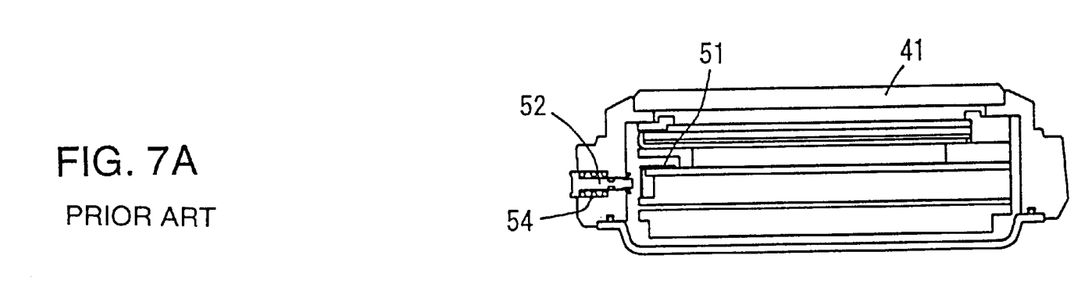
FIGS. 7A–7C are cross section of a conventional engagement device.
Figure 7B:
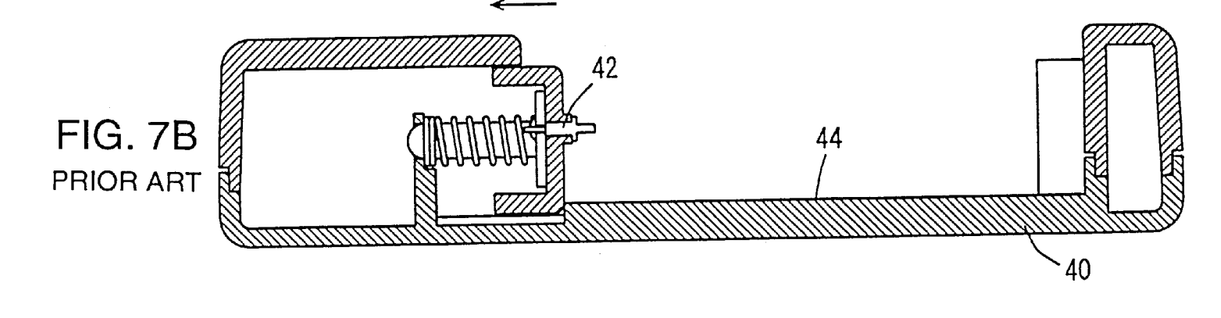
Figure 7C:
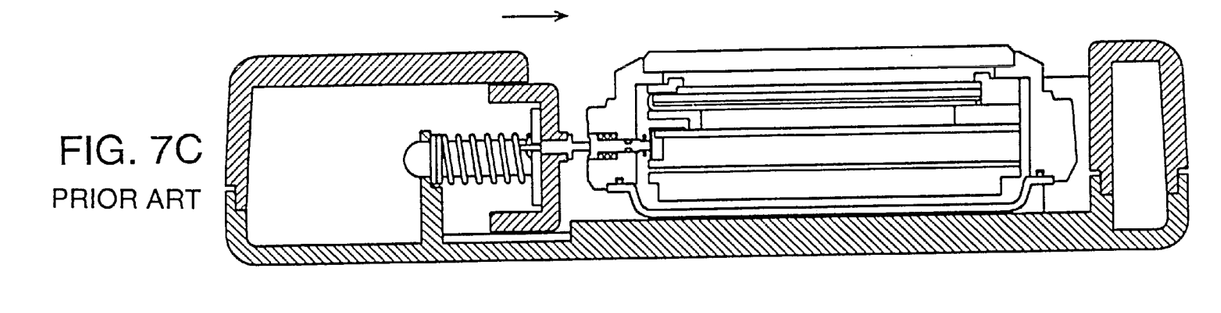

FIGS. 7A–7C are cross sections more specifically showing how interface unit 40 and information terminal 41 are interconnected. FIG. 7A is a cross section of a main portion of information terminal 41. FIG. 7B is a cross section of a main portion of interface unit 40. FIG. 7C is a cross section showing that information terminal 41 is mounted to interface unit 40.

Referring to FIG. 7A, information terminal 41, not yet mounted to interface unit 40, has a movable contact 52 biased by a spring 54 and thus out of contact with an electrical contact 51 provided internal to information terminal 41.

Referring to FIGS. 6A and 6B and 7A–7C, to mount information terminal 41 to interface unit 40, a set button 43 as shown in FIG. 6A is initially pressed. Thus, as shown in FIG. 7B, the interface unit's connecting terminal 42 moves in a direction indicated by the arrow. With connecting terminal 42 moving as described above, information terminal 41 is positioned in interface unit 40 on a bottom surface 44. When set button 43 is released with the terminal thus positioned, as shown in FIG. 7C the interface unit's connecting terminal 42 moves in the direction indicated by the arrow to push and thus bring movable contact 52 of information terminal 41 into contact with an electrical contact 51 of the body of information terminal 41 to allow signal communication therebetween.

There is a heart rate meter worn by joggers and swimmers conventionally on their arms and transmitting the user's heart rate signal from a sensor to the heart rate meter wirelessly.

If the user desires to use the heart rate meter when riding a bicycle as well as jogging and swimming, the heart rate meter is attached to the bicycle's handle or the like. This would not particularly be problematic if the bicycle's speed signal, the crank shaft's rotation signal and the like as well as the user's heart rate signal are transmitted to and received from the heart rate meter wirelessly. If any signal generated from the bicycle is transmitted and received via a wire, however, their interface contacts electrically conduct due to the user's skin, water and the like, resulting in erroneous operation.

To avoid this, it is preferable that normally an external contact and an internal interconnection be disconnected from each other and only as required the external contact and the internal interconnection be connected with each other by the above-described structure connecting interface unit 40 and information terminal 41 together. With such structure, however, interface unit 40 serving as a base is too large in size and it can thus not be mounted on a small space such as a bicycle's handle.

SUMMARY OF THE INVENTION

The present invention therefore contemplates an engagement device capable of readily engaging two members, such as a base unit and a measuring instrument, at a position as desired by the user.

In accordance with the present invention, an engagement device overlaps and thus engages first and second members with each other. The first member has one end provided with a fixed, first engaging feature, and the other end provided with a second engaging feature movable in a first direction corresponding to a direction towards one end of the first member. The second member has third and fourth engaging features engaging with the first and second engaging features, respectively. The first member has a lever moving the second engaging feature in the first direction when the second engaging feature engages with the fourth engaging feature. With the first member overlapping the second member, in a portion other than the lever the first member has a region smaller than the second member.

With the engagement device of the present invention, when the first and second members overlap, in a portion other than the lever for moving the second engaging feature in the first direction the first member occupies an area smaller than the second member. This allows the engagement device to be compact. As a result, there can be provided a device capable of readily connecting together two members, such as a base unit and a measuring instrument, at a position as desired by the user.

Preferably the lever is movable in a second direction traversing the first direction.

Still preferably the lever is biased in a direction opposite to the second direction.

Still preferably the second engaging feature has a portion obliquely traversing both of the first and second directions and the lever slides along the oblique portion to move in the first direction.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter one embodiment of the present invention will be described with reference to the drawings.

Figure 1:
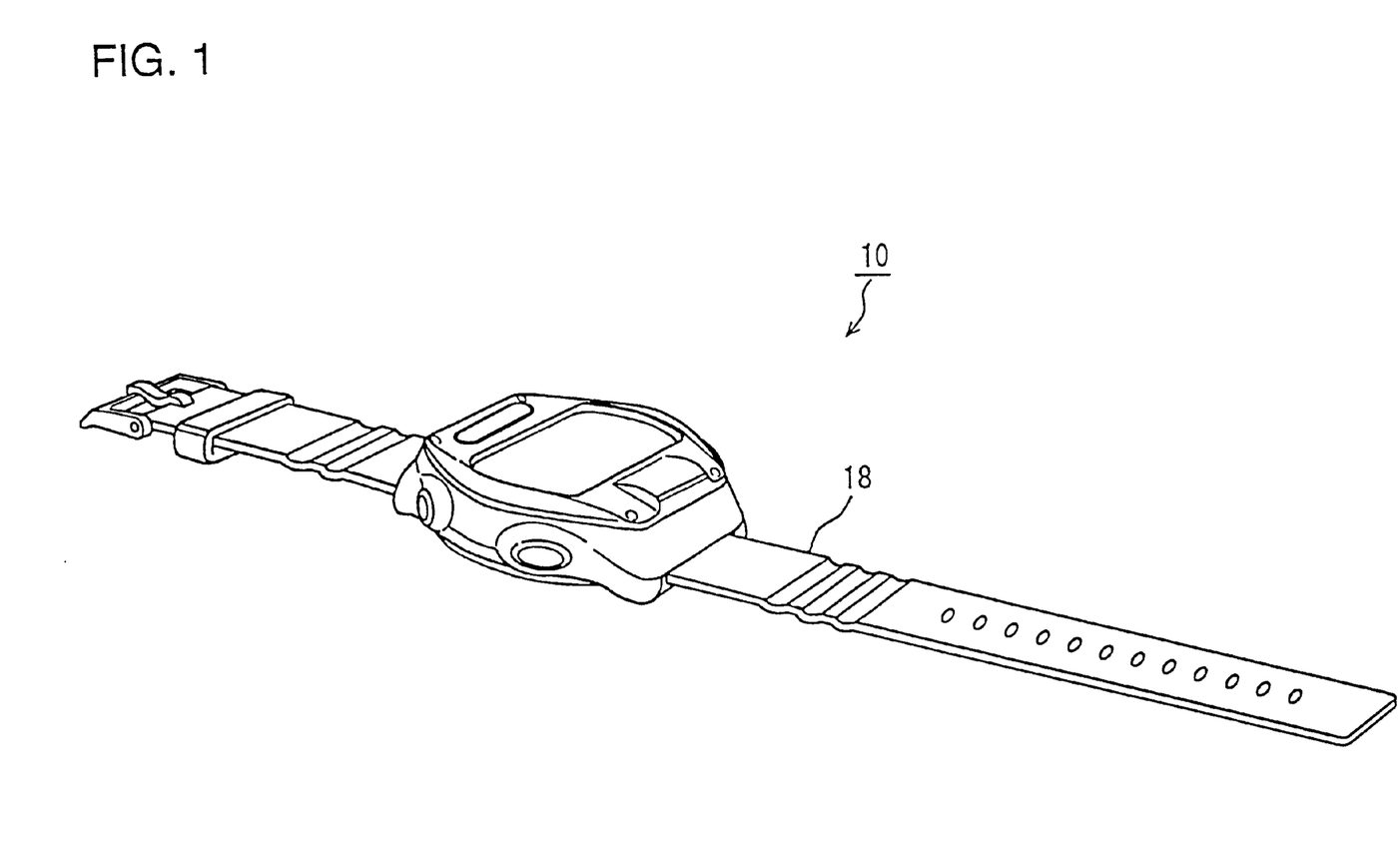
FIG. 1 is a perspective view of a heart rate meter with the present invention applied thereto.

Referring to FIG. 1, a measuring instrument to which an engagement device of the present invention applied is shown exemplarily in the form of a heart rate meter 10. Heart rate meter 10 is fit on a user's arm normally with a belt 18.

Figure 2:
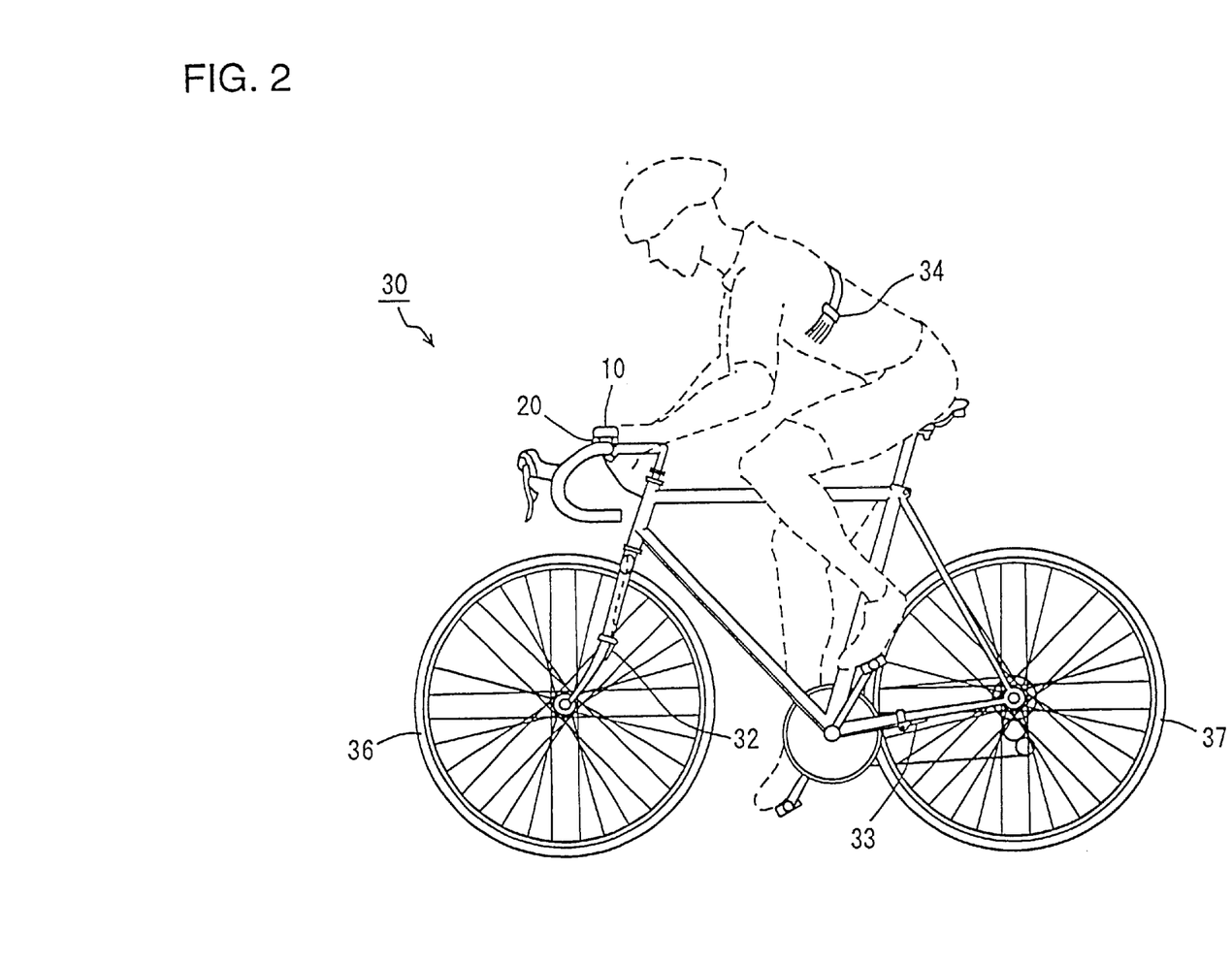
FIG. 2 is a schematic view of a bicycle with an engagement device of the present invention applied thereto.

FIG. 2 shows heart rate meter 10 connected to a bracket 20 attached to the handle of a bicycle 30, rather than a user's arm. Bicycle 30 has a front wheel 36 provided with a speed-signal transmit unit 32 detecting the front wheel's rotation to transmit the bicycle's speed signal.

Bicycle 30 has a rear wheel 37 provided with a cadence signal transmit unit 33 transmitting information on the transmission gears of bicycle 30. Speed-signal transmit unit 32 and cadence signal transmit unit 33 output their respective signals which are in turn transmitted via a cable to bracket 20 attached to the bicycle's handle.

The user wears a heart rate signal transmit unit 34 detecting the user's heart rate and transmitting a signal corresponding thereto. The heart rate signal from heart rate signal transmit unit 34 is transmitted wirelessly to heart rate meter 10.

As has been described above, when a user does not ride bicycle 30 the user wears heart rate meter 10 on the user's arm, attached with belt 18. When the user rides bicycle, heart rate meter 10 is attached to bracket 20 attached to the bicycle's handle. When heart rate meter 10 is attached to bracket 20, heart rate meter 10 also receives the speed and cadence signals from bicycle 30 and displays signals other than a heart rate signal on a display unit (not shown).

Thus the user can refer to the display on heart rate meter 10 to adjust the bicycle's speed, gear-ratio and the like.

An engagement device of the present invention is implemented at a connection between heart rate meter 10 and bracket 20 and will now be described in greater detail.

Figure 3A:
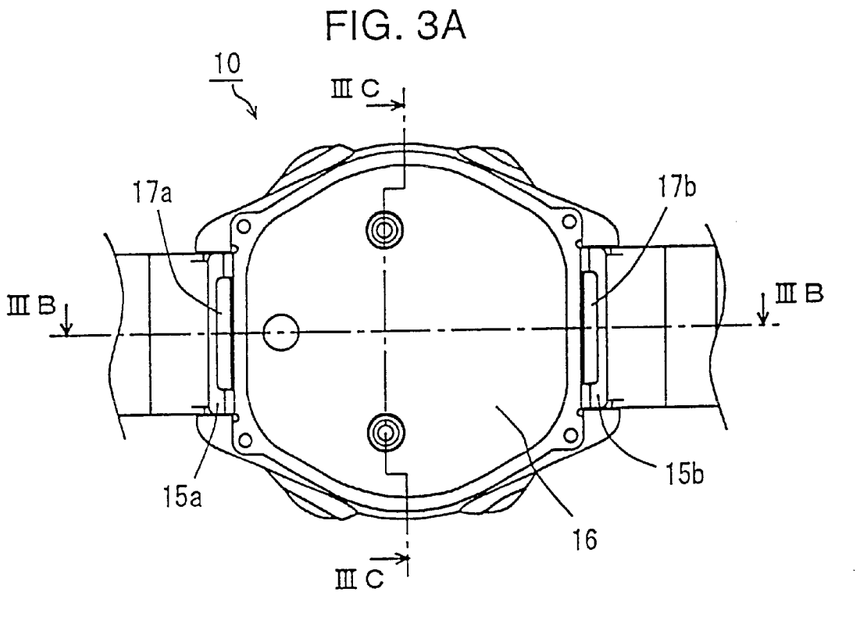
FIGS. 3A–3C show a configuration of a heart rate meter corresponding to one member with an engagement device of the present invention applied thereto.
Figure 3B:
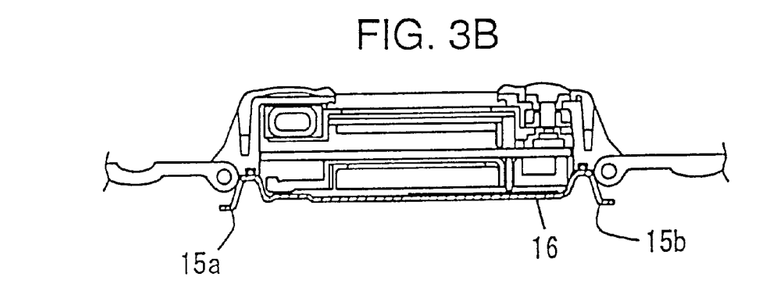
Figure 3C:
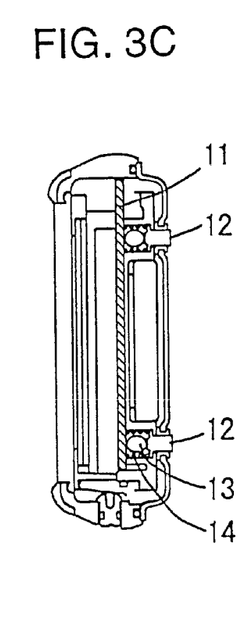

FIGS. 3A–3C show a general configuration of heart rate meter 10. FIG. 3A is a plan view of heart rate meter 10, as seen at a back side thereof engaged with bracket 20. FIG. 3B is a cross section thereof, taken along a line IIIB—IIIB of FIG. 3A. FIG. 3C is a cross section thereof, taken along a line IIIC—IIIC of FIG. 3A.

As shown in FIG. 3A–3C, heart rate meter 10 has a back side provided with two movable contacts 12 which allow bracket 20 and heart rate meter 10 to communicate an electrical signal. On the heart rate meter's back side, a receiving plate 16 is also attached having opposite ends provided with features 15a and 15b engaging with bracket 20. Engaging features 15a and 15b, as shown in FIGS. 3A and 3B, expand on the back side of heart rate meter 10 along the belt thereof and have openings 17a, 17b adjacent to their respective ends.

Referring to FIG. 3C, heart rate meter 10 includes a movable contact 12 biased by a spring 14 outwardly of heart rate meter 10, a rubber conductor sit on movable contact 12, and a printed circuit board 11 which is mounted, spaced from the rubber conductor, and corresponds to an internal circuit of heart rate meter 10. Movable contact 12 receives a signal from printed circuit board 11 and that from the bracket 20 side. While the figures show two such movable contacts 12 provided, any number of movable contacts 12 may be used.

Figure 4A:
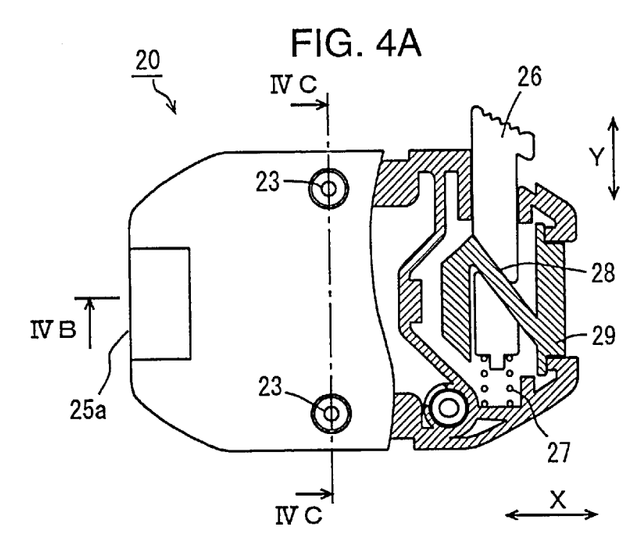
FIGS. 4A–4E show a configuration of a bracket corresponding to the other member.
Figure 4B:
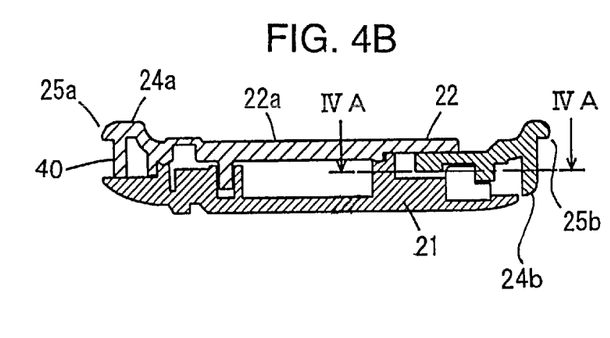
Figure 4C:
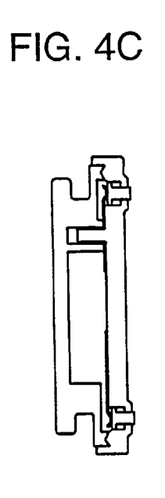
Figure 4D:
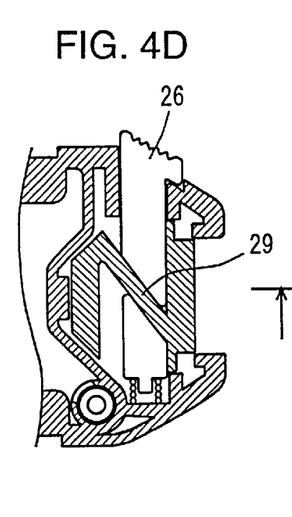
Figure 4E:
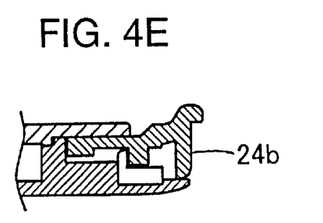

FIGS. 4A–4E show a configuration of bracket 20. FIG. 4A is a plan and partially broken view of the bracket's lower portion 21 on a side to which heart rate meter 10 is to be mounted. FIG. 4B is a cross section taken along a line indicated by an arrow IVB—IVB of FIG. 4A. FIG. 4C is a cross section taken along a line indicated by an arrow IVC—IVC of FIG. 4A. FIG. 4D is a view, as compared with the FIG. 4A broken view, showing how the lower portion 21 movable portion can move when heart rate meter 10 engages with the bracket's lower portion 21. FIG. 4E is a view corresponding to a right end of FIG. 4B, although in the position as shown in FIG. 4D. It should be noted that a broken view shown in FIG. 4A is a view taken along line IVA of FIG. 4B.

Bracket 20 is attached to the handle of bicycle 30 with a fixing member (not shown).

As shown in FIGS. 4A–4E, bracket 20 includes a lower portion 21 and an upper portion 22 provided at a front side of lower portion 21. Upper portion 22 has a bracket contact 23 connected to movable contact 12 of heart rate meter 10. Lower portion 21 has one end with an end 24a lifted higher than a flat portion 22a of upper portion 22. End 24a has a protrusion 25a at the left-hand end 24a side of lower portion 21. Protrusion 25a has a lower portion mating with engaging feature 15a of heart rate meter 10. End 24a has a support 40 via which lower portion 21 supports end 24a.

The bracket's lower portion 21 has a right end as described below: Bracket 20 has a right end provided with a lever 26 movable in the Y direction as shown in FIG. 4A. Lever 26 has a lower end biased by a spring 27 to protrude from lower portion 21. Lever 26 has a groove 28 oblique with respect to both of the X and Y directions in the figure. Engaging with groove 28, a Z-letter piece 29 is fit. Z-letter piece 29 as shown in FIG. 4A has a Z-letter shape as seen in the Y direction. Along the lever's groove 23 moves a side of Z-letter piece 29 that is oblique with respect to the X and Y directions. More specifically, when lever 26 is pushed in the Y direction downward, Z-letter piece 29 moves relative to the bracket's lower portion 21 in the X direction to the left.

Referring to FIGS. 4B and 4E, Z-letter piece 29 has an end 24b similar to left end 24a, having a protrusion 25b in the X direction at the bracket's right side. When Z-letter piece 29 moves in the X direction to the left, protrusion 25b mates with engaging feature 15b through opening 17b of heart rate meter 10.

Figure 5A:
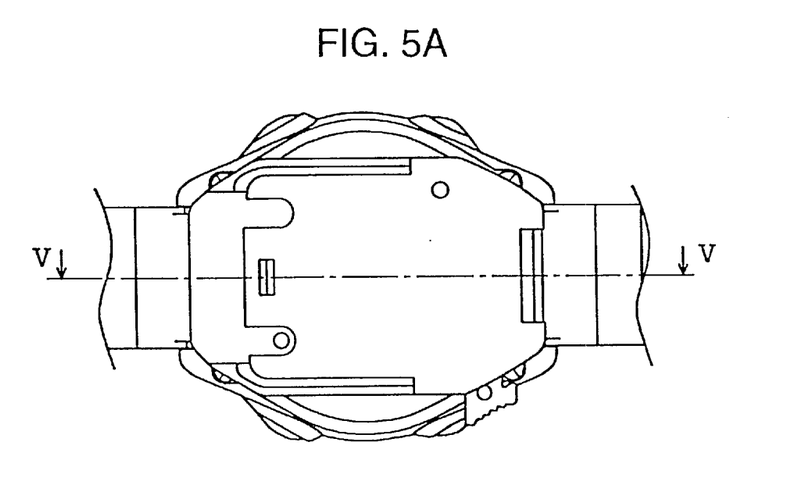
FIGS 5A–5D show a process for connecting a heart rate meter and a bracket together.
Figure 5B:
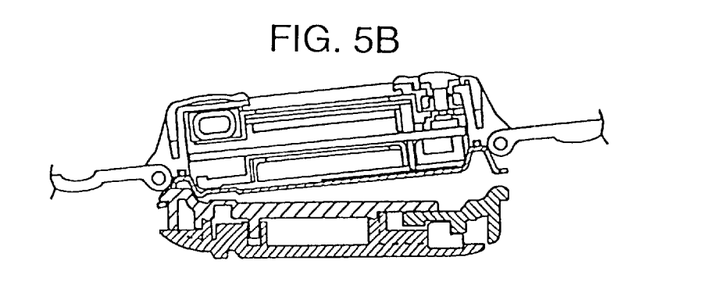
Figure 5C:
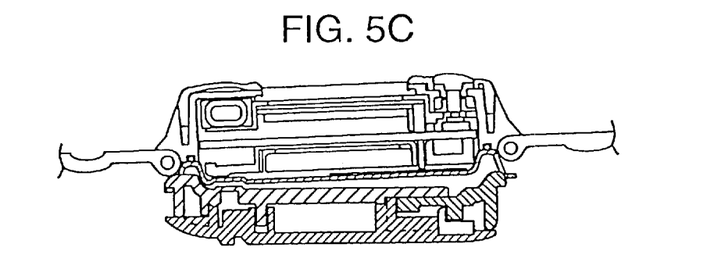
Figure 5D:
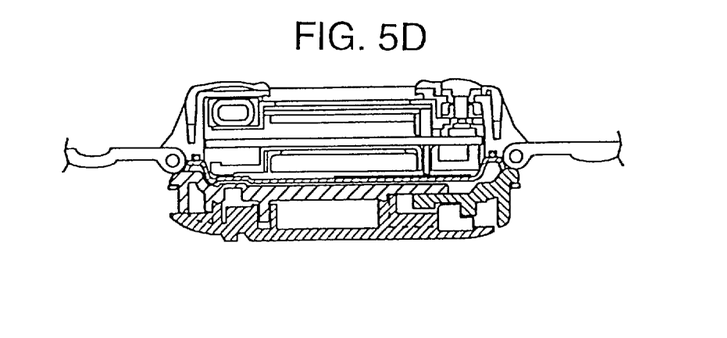

FIGS. 5A–5D show how heart rate meter 10 is attached to bracket 20 step by step. FIG. 5A is a rear view of bracket 20 with heart rate meter 10 overlapping and thus mounted thereon, as seen at a back side thereof, and FIGS. 5B–5D are cross sections taken along line V—V of FIG. 5A.

As shown in FIG. 5B, the heart rate meter's engaging feature 15a initially engages with protrusion 25a of one end 24a of the bracket's lower portion 21. Then, by pushing lever 26, Z-letter piece 29 corresponding to the right end of the bracket's lower portion 21 moves in the X direction, as shown in FIG. 4D. In this condition, engaging feature 15b engages with the other end 24b of Z-letter piece 29 (FIG. 5D). When lever 26 is released with such engagement achieved, spring 27 causes biased lever 26 to return upwards. This ensures the bracket's right end 25 mates with the heart rate meter's right engaging feature 15b.

When such engagement is achieved, the bracket's bracket contact 23 pushes the heart rate meter's movable contact 12 and rubber conductor 13 placed thereon. Consequently, rubber conductor 13 can be brought into contact with printed circuit board 11 to allow signal communication therebetween.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An engagement device with first and second members overlapping and thus engaging with each other, wherein:

said first member has one end provided with a fixed, first engaging feature, and the other end provided with a second engaging feature movable in a first direction corresponding to a direction toward said one end;

said second member has third and fourth engaging features engaging with said first and second engaging features, respectively;

said first member has a lever moving said second engaging feature in said first direction when said second engaging feature engages with said fourth engaging feature;

with said first member overlapping said second member, in a portion other than said lever said first member has a region smaller than said second member; and said second engaging feature has a portion obliquely traversing said first and second directions and said lever slides along said oblique portion to move said second engaging feature in said first direction.

2. The engagement device of claim 1, wherein said lever is biased in a direction opposite to said second direction.

* * * * *